United States Patent [19]
Aurness et al.

[11] Patent Number: 5,117,456
[45] Date of Patent: May 26, 1992

[54] WALL MOUNTED TELEPHONE CORD REEL

[76] Inventors: Harold O. Aurness, 5808 Knox Ave. No., Brooklyn Center, Minn. 55430; Daniel R. Saufferer, 8126 Colfax Ave. So., Bloomington, Minn. 55420

[21] Appl. No.: 552,495

[22] Filed: Jul. 16, 1990

[51] Int. Cl.⁵ ............... H04M 1/00; H02G 11/00; B65H 75/48
[52] U.S. Cl. ............... 379/438; 379/451; 191/12.2 R; 242/107
[58] Field of Search ............... 379/438, 451; 191/12.2 R, 12.4; 242/107, 107.1, 107.11

[56] References Cited

U.S. PATENT DOCUMENTS

| | | | |
|---|---|---|---|
| 2,678,779 | 5/1954 | Bellmer | 379/439 |
| 3,061,234 | 10/1962 | Morey | 242/107.1 |
| 3,953,688 | 4/1976 | Rocha | 379/438 |
| 4,062,608 | 12/1977 | Pierce | 379/438 |
| 4,120,467 | 10/1978 | Stephenson | 242/107 |

FOREIGN PATENT DOCUMENTS

| | | | |
|---|---|---|---|
| 0161963 | 9/1984 | Japan | 379/438 |
| 0100054 | 5/1987 | Japan | 379/438 |

*Primary Examiner*—James L. Dwyer
*Assistant Examiner*—Jason Chan

[57] ABSTRACT

A telephone cord reel according to the teachings of the present invention is shown as including a non-metallic housing base with end walls and divider walls separating a cord reel with a spring activated recoil action from a copper clad disk rotatable with the cord reel. Insulated positive and negative wires extend from the cord reel into a connecting tube where they separate at connecting wires which go to opposite sides of the disk. Copper brushes contacting the rotating disk on each side bring the current through a divider wall to a phone jack which allows connection to the phone housing. Alternate means are provided to secure the unit in or on a wall with alternate covers which have exit holes for the phone cord with means to brake the recoil action of the reel.

3 Claims, 1 Drawing Sheet

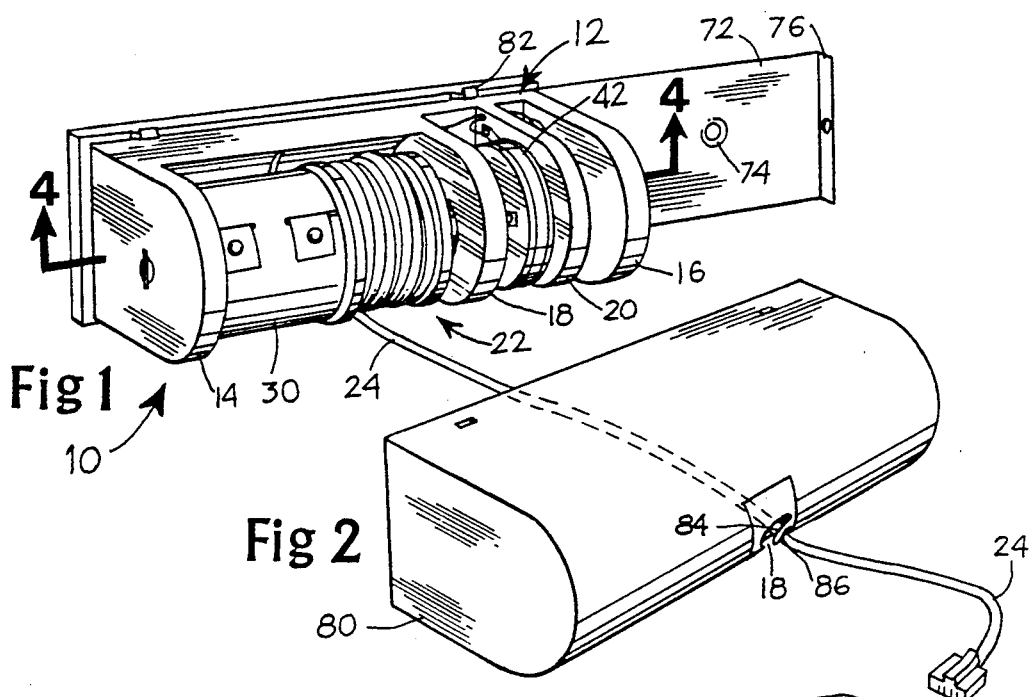
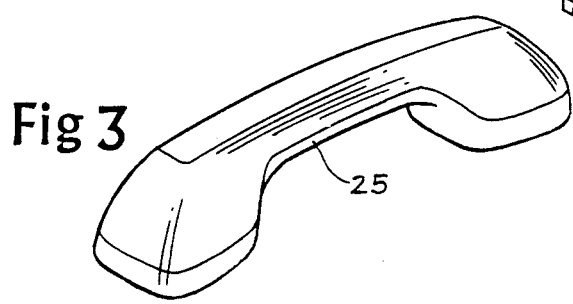
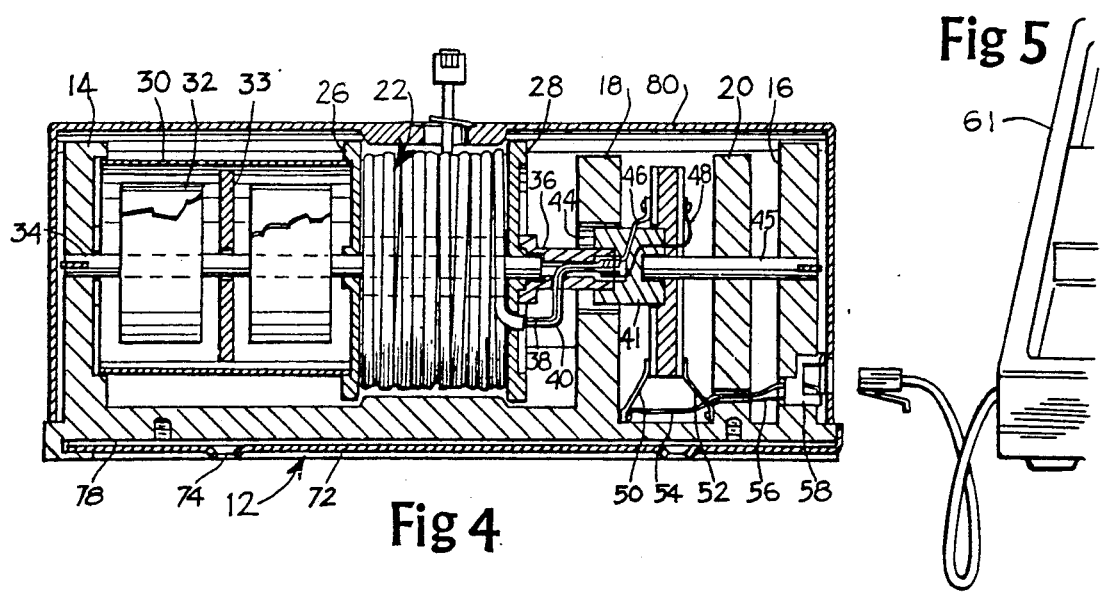

WALL MOUNTED TELEPHONE CORD REEL

BACKGROUND OF THE INVENTION

This invention relates to telephone cords which are needed to be longer than is ordinarily provided and a means to reel them in in such a way as to provide a gentle action.

There are a number of patented cord reels using similar methods to store long phone cords. Some feature concentrically or spiral wound single springs such as U.S. Pat. Nos. 3,061,234 (Morey); 4,062,608 (Pierce); and 2,678,779 (Bellmer), which provide the cord recoil.

It is an object of this invention to provide a cord reel unit having a gentler recoil action that the present state of the art by using two flat spiral springs side by side, each having a weaker recoil strength than would be required by only one spring.

It is another object of this invention to provide simple attachments of the cable to the unit.

It is also an object of this invention to provide a simple installation means for mounting on a wall or a desk.

With the ever increasing use of telephones in business of all kinds and in homes it is desirable to have a more mobile cord phone for convenience and privacy purposes and to avoid some of the problems associated with a cordless phone.

SUMMARY OF THE INVENTION

The present invention meets this need by providing in the preferred embodiment, a phone cord reel to hold a phone cord of considerable length attachable to a phone handset at one end and, through a series of connections, to a phone station at another end. Specifically, a set of side-by-side coil clock springs are attached to an immovable first axle by a center end and to a cover casing at an outer end. The cover casing is an extension from the flanged phone cord reel sharing the axle which extends only through the coil springs and the reel from an end wall of a housing base holding the unit. The coil springs unwind when the reel is turned due to one end of the coils remaining stationary in the axle.

The axle continues as a separate tubular extension holding separate insulated wires leading from the phone cord which combine with a second set of wires extending back through a neck member of a non-metallic disk rotatably related to the phone cord reel by connection to the tubular extension. The second set of wires attaches separately to each side of the disk which is copper plated. A second immovable axle aligned with the first axle extends from the other end wall of the housing base through a supporting divider wall to the disk to help support the rotating members of the unit.

The present invention further meets the need by providing, in the preferred embodiment, a set of stationary copper contact brushes mounted on the housing base to transfer current from the phone station through a phone jack on the end wall and through wires on the housing base to the rotating disk and into the handset through the rotating phone cord.

Further improvement is provided by a mounting box for flush mounting the unit in a wall. The mounting box features brackets, movable inside slots of the box inside the wall which enable the box to be pulled and secured firmly against the wall. A cover plate attached by screws to the box features a spring-biased exit hole cover which allows the phone cord out but stops it from recoiling by binding until held open by hand.

Further improvement is provided by the inclusion of a mounting plate for mounting the unit on a wall which allows the housing base to slide over the mounting plate secured to the wall in slots provided on the housing base.

Further improvement is provided by a housing cover featuring an exit opening for the phone cord providing a catch hook which wedges the phone cord to stop the recoil action.

BRIEF DESCRIPTION OF THE DRAWINGS

FIG. 1 shows a perspective view of the phone cord reel unit without a cover and including a perspective view of the mounting box.

FIG. 2 shows a perspective view of the housing cover.

FIG. 3 shows a perspective view of a telephone handset in connectable relation to the telephone cord.

FIG. 4 shows a cross-sectional view of the unit according to section line 4—4 of FIG. 1

FIG. 5 shows a perspective view of a telephone station box in connectable relation to the telephone cord reel unit.

DETAILED DESCRIPTION OF THE PREFERRED EMBODIMENT

A phone cord reel unit is generally shown in the drawing and generally designated 10. Unit 10 comprises a housing base which is rectangular and non-metallic and generally designated 12 with two end walls 14 and 16 at the ends. The housing base 12 also has two divider walls 18 and 20 in spaced relation near one end parallel to the end walls 14 and 16.

At a center location of the housing base 12 is phone cord reel 22 holding a wound phone cord 24 of considerable length between flanges 26 and 28 of the cord reel 22 and which phone cord 24 is attachable to a telephone handset 25. Abutting the phone cord reel 22 at one end of the housing base 12 is a cylindrical casing 30 extending to the end wall 14 as an extension of, and rotatable with, the phone cord reel 22.

Within the casing 30 are two coil springs 32 parallel, and in spaced relation to a spacer 33. Each coil spring is attached by its outer end to the casing 30 and by its inner end to a cylindrical axle 34 fastened immoveably to the center of the end wall 14. The casing 30 provides room for the springs 32 to unwind as the phone cord is pulled out the full length. The axle 34 extends through the center of the phone cord reel 22 to terminate in the flanged end of a non-metallic connecting tube 36 abutting and rotatable with the phone cord reel 22.

The connecting tube 36 houses the negative and positive insulated wires 38 and 40 from the phone cord reel 22 from which the outside casing has been removed and which comes through the flange 28 of the phone cord reel 22 and into the side of the connecting tube 36. The connecting tube 36 extends, with locking means into the centered well hole of a larger diameter nonmetallic neck member 41 extending from a disk 42 copper clad on both sides and rotatable with the phone cord reel 22. The disk 42 is separated from the phone cord reel 22 by a divider wall 18 through which the connecting tube 36 and disk neck member 41 meet and freely rotate in a circular opening 44. An immovable axle 45 matching the immovable axle 34 from end wall 14 extends from end wall 16 into the disk neck 41 through divider wall 20.

The disk neck 41 holds, embedded, negative and positive electric wires 46 and 48 which are connected in assembly to the phone wires 38 and 40 in the connecting tube 36 and lead out of the disk neck 41 at one point to connect to the copper plate on one side of the disk 42 and at another point to connect to the other copper plate on the other side of the disk 42 but in positions which keep them from touching current contact brushes 50 and 52 as the disk 42 rotates. The current contact brushes 50 and 52 are flat, thin copper bars extending from divider walls 18 and 20 to contact the disk 42. The current contact brushes have spring tension contact for transferring current from the disk through wires 54 and 56 extending from the contact brushes 50 and 52 through the divider wall 20 to a phone jack 55 in the end wall 16 which connects to a phone station 60.

Mounting means for unit 10 comprises a rectangular mounting plate 72 approximately the same dimensions as the housing base 12 with counter-sunk spaced bolt holes 74 and a raised lip 76 at one short side end. The mounting plate 72 slides into side slots 78 on the bottom of the housing base 12 after being bolted to the wall. A housing cover 80 can then be attached by clip means 82 to the housing base 12. The housing cover 80 features an opening 84 at a center point with a recoil brake in the form of a V-shaped hook member 86 which catches and pinches the phone cord 24 when flipped by the user.

We claim:

1. A telephone cord reel unit for mounting on a wall joining a removable telephone handset at one end of a phone cord to a removable telephone station box, comprising:

a non-metallic housing base with first and second end walls, and first and second supporting divider walls;

a flanged phone cord reel for holding the phone cord comprising first and second end flanges;

a first immovable axle extending centrally from first end wall to a flanged, non-metallic connecting tube joining said flanged phone cord reel to a non-metallic disk which is copper plated on both sides of said non-metallic disk said non-metallic disk located between the first and second supporting divider walls and rotatable with the phone cord reel;

recoil means in the form of a plurality of side-by-side coil springs within a cylindrical casing and attached to the first immovable axle and said cylindrical casing, said cylindrical casing extends tandemly, as a part of the cord reel, between said first end wall and said first flange;

a second immovable axle extending centrally from said second end wall of said non-metallic housing base to the non-metallic disk through said second supporting divider wall;

said unit further comprising the phone cord extending through an opening in said second end flange of the phone cord reel to connect to first electric wires, said first electric wires extending through a passage in said flanged, non-metallic connecting tube to couple to second electric wires which are partically embedded in a non-metallic center neck member of said non-metallic disk; and first and second contact brushes mounted on said first and second supporting divider walls respectively, said first contact brush extending to the copper plate at one side of said non-metallic disk and said second contact brush extending to the copper plate at the other side of said non-metallic disk, said first and second contact brushes having spring tension contact for transferring electric current to telephone wires, said telephone wires attached to said first and second contact brushes and extending to a phone jack in said second end wall, wherein said first and second contact brushes contacting the copper plates of said non-metallic disk provide a means for continual, uninterrupted current flow between the handset and the telephone station box.

2. The telephone cord reel unit of claim 1 further comprises a housing cover, said housing cover being attached to said non-metallic housing base by a clip means formed on said non-metallic housing base, said housing cover having an opening with a V-shaped hook member which catches and pinches the phone cord when flipped by the user.

3. The telephone cord reel of claim 1 wherein the recoil means comprise a minimum of two coil springs each of a ribbon-like cross section arranged side-by-side inside said cylindrical casing abutting and rotatable with said phone cord reel;

a laterally spacer between the coil springs; and said first immovable axle extending through the casing and the phone cord reel, one end of each said coil springs attached to said first immovable axle and the other end of each of said coil springs attached to said casing.

* * * * *